Aug. 23, 1966          J. R. VUKOVICH          3,267,522

DEVICE FOR PRODUCING EMBOSSED TUBING

Filed April 12, 1965          2 Sheets-Sheet 1

INVENTOR
JOHN R. VUKOVICH

BY *Howard W. Hausman*

ATTORNEY

Aug. 23, 1966  J. R. VUKOVICH  3,267,522
DEVICE FOR PRODUCING EMBOSSED TUBING
Filed April 12, 1965  2 Sheets-Sheet 2

INVENTOR
JOHN R. VUKOVICH
BY
Howard W. Herman
ATTORNEY

United States Patent Office 3,267,522
Patented August 23, 1966

3,267,522
DEVICE FOR PRODUCING EMBOSSED TUBING
John R. Vukovich, Midland, Mich., assignor to Dow Corning Corporation, Midland, Mich., a corporation of Michigan
Filed Apr. 12, 1965, Ser. No. 447,405
2 Claims. (Cl. 18—19)

The present invention relates to the manufacture of polymeric tubing and more particularly, to the manufacture of polymeric tubing having embossed indicia or the like thereon.

Polymeric materials in tubular form are finding many uses in industry. Such materials are finding particular use as electrical insulation. Of keen interest at the present time are polymeric materials of the type having a so-called "plastic memory." By plastic memory is meant materials which are treated in a manner to provide a characteristic which allows them to retain their shape and dimensions under low and normal temperature conditions, but in which heat, when applied in sufficient amount to raise them to a critical temperature tends to cause them to shrink to their pretreatment shape and dimensions. Materials having these characteristics are also known as "heat shrinkable." Such materials are described in U.S. Patent No. 3,086,242. A problem inherent in the manufacture of heat shrinkable tubing and other polymeric tubings as well, is that of providing suitable indicia on the tubing for identification of size and manufacturer. It is toward the solution of this problem that the present invention is directed.

It is an object of the present invention, therefore, to provide a device for producing heat shrinkable tubing having embossed indicia imprinted thereon. A further object is a provision, for use in the production of embossed polymeric tubing, of a device suitable for such use in an economical manner and adaptable to large scale production.

In accordance with these and other objects, there is provided by the present invention a device similar to that described in the aforementioned application Serial No. 408,123, but further including means for embossing any desired indicia on the tubing as the same is expanded. Other objects and many attendant advantages of the invention will become better understood by those skilled in the art by a consideration of the following detailed description when read in connection with the accompanying drawings wherein.

Figure 1:
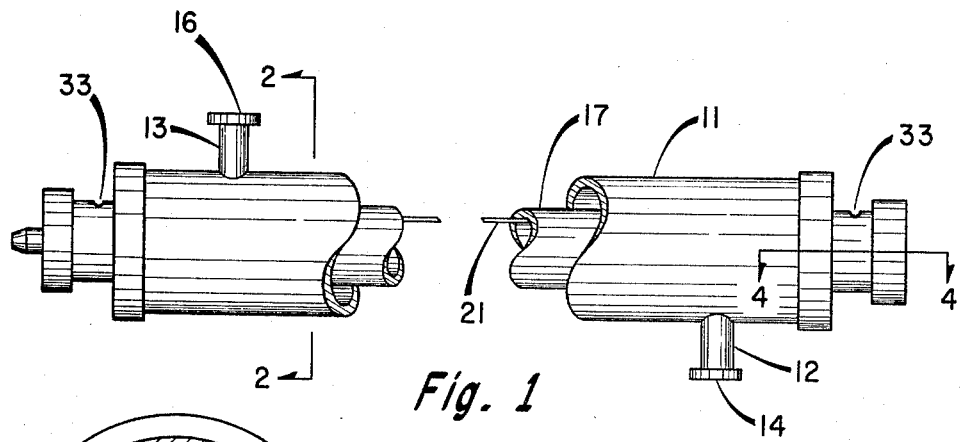
FIG. 1 is a side view in elevation of an embodiment of the invention.
Figure 2:
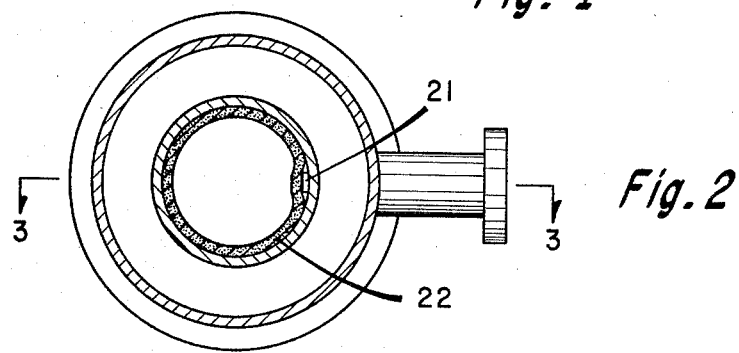
FIG. 2 is a cross-sectional view taken along the line 2—2 of FIG. 1.

Referring now to the drawings wherein like reference numerals designate like or corresponding parts throughout the several views, there is shown in FIG. 1 a jacket 11, which is provided with inlet and outlet pipes 12 and 13. The inlet and outlet pipes 12 and 13 have couplings 14 and 16 at the outer ends for connection to steam and cold water lines for reasons that will become apparent hereinafter with reference to the operation of the device.

Figure 3:
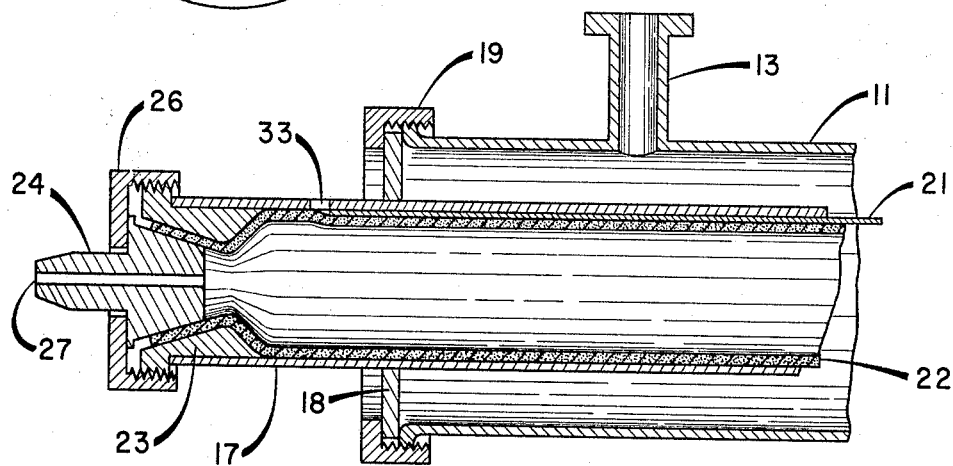
FIG. 3 is a longitudinal cross-sectional view of one end of the structure shown in FIG. 2 taken along the line 3—3 of that figure and showing the tubing mounted in place.

A mold pipe 17 is mounted within the jacket 11 by any suitable means such as brazing or welding to a plate 18 as shown in FIG. 3. The mold pipe 17 may be made of any suitable rigid heat conducting material such as copper, or the like, and has an internal diameter substantially equal to the desired expanded external diameter of the heat shrinkable tubing to be formed. The plate 18 is preferably detachably coupled to the jacket 11 by means such as a coupling 19 so that mold pipes of different sizes may be interchangeably inserted into the jacket. A metal tape 21 having indicia imprinting means carried thereon, as will be described in greater detail hereinafter is mounted along one portion of the internal surface of the mold pipe 17.

As may be seen more clearly from FIG. 3, a length of vulcanized heat shrinkable tubing 22 is inserted into the mold pipe 17 for expansion. A collar, or the like 23, is placed in the end of the pipe 17 around the tubing 22 and a gas inlet fitting 24 having a tapered surface is inserted into the end of the tubing and wedges the tubing against the collar 23 to form a seal. A clamping ring 26 is used to secure the gas inlet fitting 24 in place in sealing relationship with the end of the tubing. The fitting 24 has a bore 27 extending axially through it to allow air or other gas to be injected into the tubing from a suitable source of compressed gas (not shown).

Figure 4:
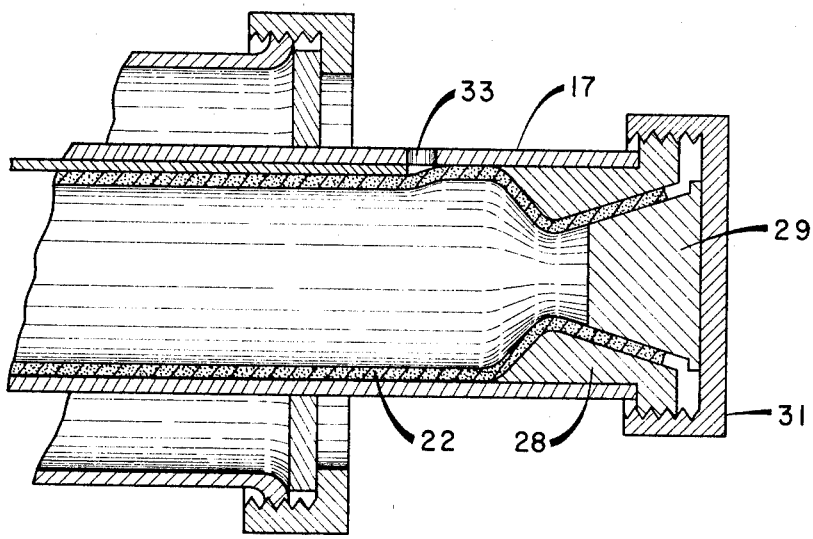
FIG. 4 is a longitudinal cross-sectional view of the other end of the structure shown in FIG. 1 taken along the line 4—4 of that figure and showing the tubing in place.

As shown in FIG. 4, the opposite end of the tubing 22 is sealed by any suitable means such as a collar 28 and a wedge plug 29 which is wedged into sealing relationship with the tubing and collar 28 by means of a clamping ring or the like 31.

Figure 5:
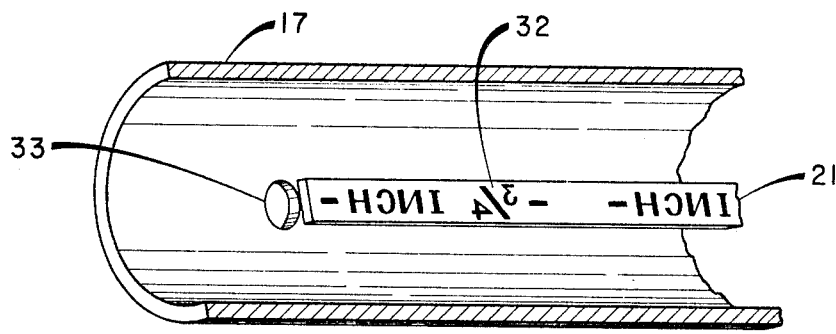
FIG. 5 is a cutaway view of the mold pipe of the embodiment of FIG. 1 showing details of the indicia embossing strip mounted on the mold wall.

Referring now to FIG. 5, there is shown inside the mold pipe 17 a tape 21, of suitable metallic material and having raised or indented lettering 32 in the shape of a mirror image of the indicia described to be printed on the surface of the tubing 22. The tape 21 must be of relatively small thickness compared to the wall thickness of the tubing 22 to allow the tubing to remain substantially cylindrical. At each end of the tape 21 there is provided a hole 33 through the wall of the mold pipe for release of entrapped air. Additional holes along the tape may be provided, if desired.

With the tubing to be expanded mounted in the mold pipe as shown in FIGS. 3 and 4, heat is applied to raise the tubing temperature sufficiently high to melt the crystalline material in the tubing. This may be done, for example, by injection of heated steam into the jacket 11 by connection of the inlet and outlet pipes 12 and 13 to a steam system. When the necessary tubing temperature has been reached, gas under pressure is injected into the tubing by means of the fitting 24, and the tubing is expanded to the internal diameter of the mold pipe 17. Alternatively, it is possible to expand the tubing prior to heating, if desired. As the tubing expands, the raised or indented lettering 32 on the tape 21 is imprinted into the surface of the tubing 22, thus providing the desired indicia thereon. The tape 21 serves a dual purpose in that due to the fact that the tubing will not completely envelope it, it acts with the inner surface of the mold pipe 17 to form channels at either side thereof to conduct any entrapped gases out of the mold pipe by means of the holes 33. Alternatively, holes may be provided through the tape to permit passage of gases to an outlet duct formed between the tape and the mold tube. This insures diameter uniformity of the expanded tubing, which otherwise would be likely to have sections of reduced diameter or irregular spots due to air bubbles entrapped as the pipe is expanded.

When the tubing has been expanded to fill the mold pipe, the jacket is cooled, for example, by connection of the inlet and outlet pipes 12 and 13 into a cold water system. The cooling causes the tubing to recrystallize in its expanded state, thereby holding the tubing in the expanded condition as explained in the aforementioned patent and patent applications.

Various modifications of the aforedescribed embodiment are possible. A similar system may be used, of course, with ordinary, rather than heat shrinkable polymeric or elastomeric tubing. In cases where heat shrinkable tubing is not used, only the indicia need be heated in order to emboss desired indicia on thermoplastic tubing. The specific heating means, cooling means, coupling means and sealing means described hereinabove, are shown by way of example, and it is to be understood that means other than those shown may be used for these purposes.

Many other modifications and variations of the present invention are possible in the light of the following description and will become obvious to those skilled in the art. Accordingly, it is to be understood that within the scope of the appended claims the invention may be practiced, otherwise than as specifically described.

That which is claimed is:

1. A device for producing embossed tubing comprising
    a mold pipe having a predetermined internal diameter,
    means for expanding said tubing within said mold pipe, and
    an elongated indicia carrying strip mounted longitudinally in said mold pipe along a wall thereof and extending continuously along a substantial portion of the length thereof for embossing said tubing as said tubing is expanded,
    said strip having at least one abrupt edge, and said strip having sufficient thickness at said abrupt edge to form with said mold pipe wall a continuous air passage for exhausting air from between said tubing and said mold pipe.

2. A device as defined in claim 1, and further including a hole through said mold pipe in communication with said air passage for conducting air through the wall of said mold pipe.

References Cited by the Examiner
UNITED STATES PATENTS

| | | |
|---|---|---|
| 1,371,501 | 3/1921 | McLane. |
| 1,969,083 | 8/1934 | Lawson _____ 18—44 |
| 2,679,663 | 6/1954 | Schwemler. |
| 2,826,784 | 3/1958 | Pratt _____ 18—19 |
| 2,866,230 | 12/1958 | Holte _____ 18—19 |
| 3,175,246 | 3/1965 | Loges et al. _____ 18—19 XR |
| 3,182,355 | 5/1965 | Arnaudin _____ 18—19 |

WILLIAM J. STEPHENSON, *Primary Examiner.*